Aug. 19, 1952

L. W. EVANS 2,607,310

WELDING FIXTURE

Filed Jan. 28, 1948

INVENTOR.
LLEWELLYN W. EVANS
BY
Joseph B. Gardner
his atty.

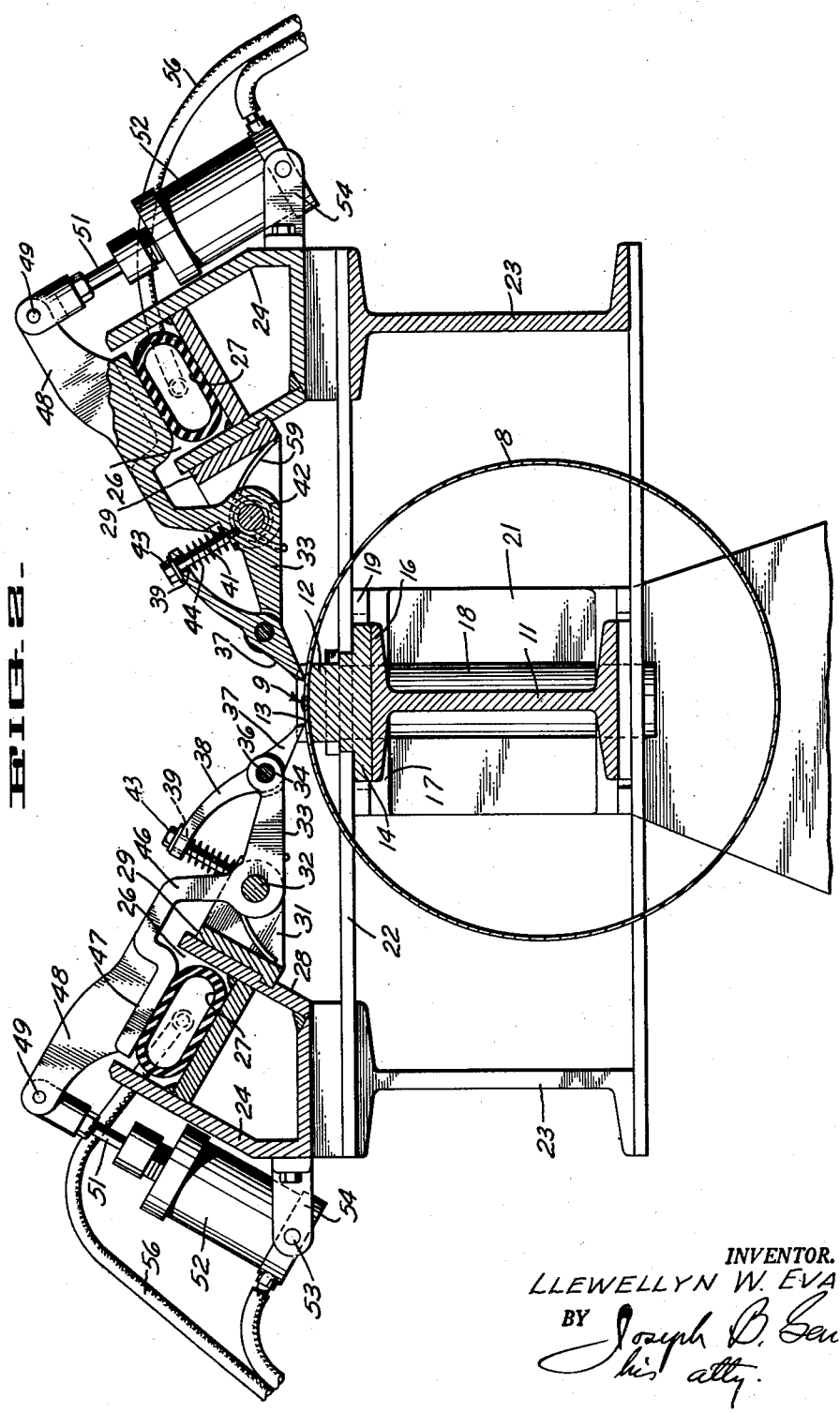

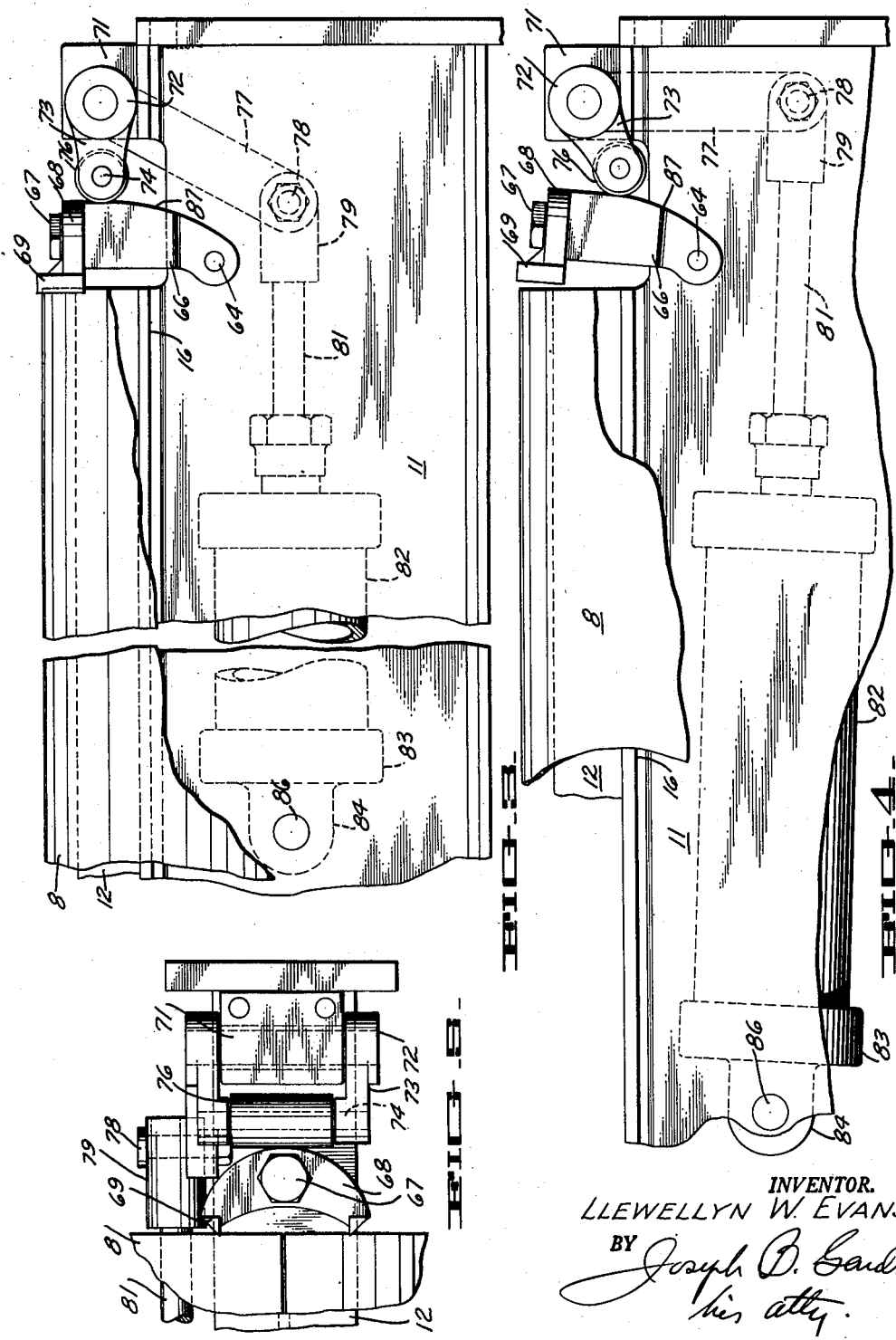

INVENTOR.
LLEWELLYN W. EVANS
BY Joseph B. Gardner
his atty.

Patented Aug. 19, 1952

2,607,310

UNITED STATES PATENT OFFICE 2,607,310

WELDING FIXTURE

Llewellyn W. Evans, Rivera, Calif., assignor to Rheem Manufacturing Company, Richmond, Calif., a corporation of California Application January 28, 1948, Serial No. 4,909

2 Claims. (Cl. 113—102)

This invention relates to work-holding fixtures of the class designed particularly for use with automatic welding apparatus.

An object of the invention is to provide a fixture for securely holding opposed plate edges in substantially parallel abutting relationship while a weld bead is applied to the interstice between the plates to fuse the latter together.

Another object of the invention is to provide a fixture of the character described capable of accommodating comparatively lengthy work and provided with multiple hold-down jaws engageable with the work along the butt or seam line thereof, which jaws are each capable of independent positioning relative to others of the jaws so as to compensate for slight irregularities in the surfaces being gripped and to automatically compensate for possible unequal wear which may occur in the work-engaging portions of the respective jaws.

A further object of the invention is to provide a fixture designed to hold a pair of abutted plate portions in coplanar relation while a continuous electric weld is made along the butt line and to further securely hold the plates against relative separation laterally along the butt line which normally would take place due to linear expansion caused by retention of heat by the plates which is absorbed from the welding arc.

Still another object of the invention is to provide cooperating jaws, functioning to effect the aforesaid lateral securing of the plate portions, which are actuated by improved motivating means arranged to cause actual penetration by the jaws of portions of the plates adjacent the butt line.

Yet another object of the invention is to provide a work-holding welding fixture designed to prevent the accumulation of an excessive amount of weld spatter on the hold-down jaws so that proper functioning thereof will not be interfered with.

The invention possesses other objects and features of advantage, some of which, with the foregoing, will be set forth in the following description of the preferred form of the invention which is illustrated in the drawings accompanying and forming part of the specification. It is to be understood, however, that variation in the showing made by said drawings and description may be adopted within the scope of the invention as set forth in the claims.

Referring to the drawings:

Figure 2 is a vertical sectional view taken in the plane indicated by the line 2—2 of Figure 1.

Figure 3 is an enlarged scale side elevational view of a portion of the fixture illustrating the end gripping jaw mechanism and showing the jaws in work-engaging position.

Figure 4 is a view similar to Figure 3 showing the jaws in disengaged position.

Figure 5 is a top plan view of the structure shown in Figure 3.

Figure 1:
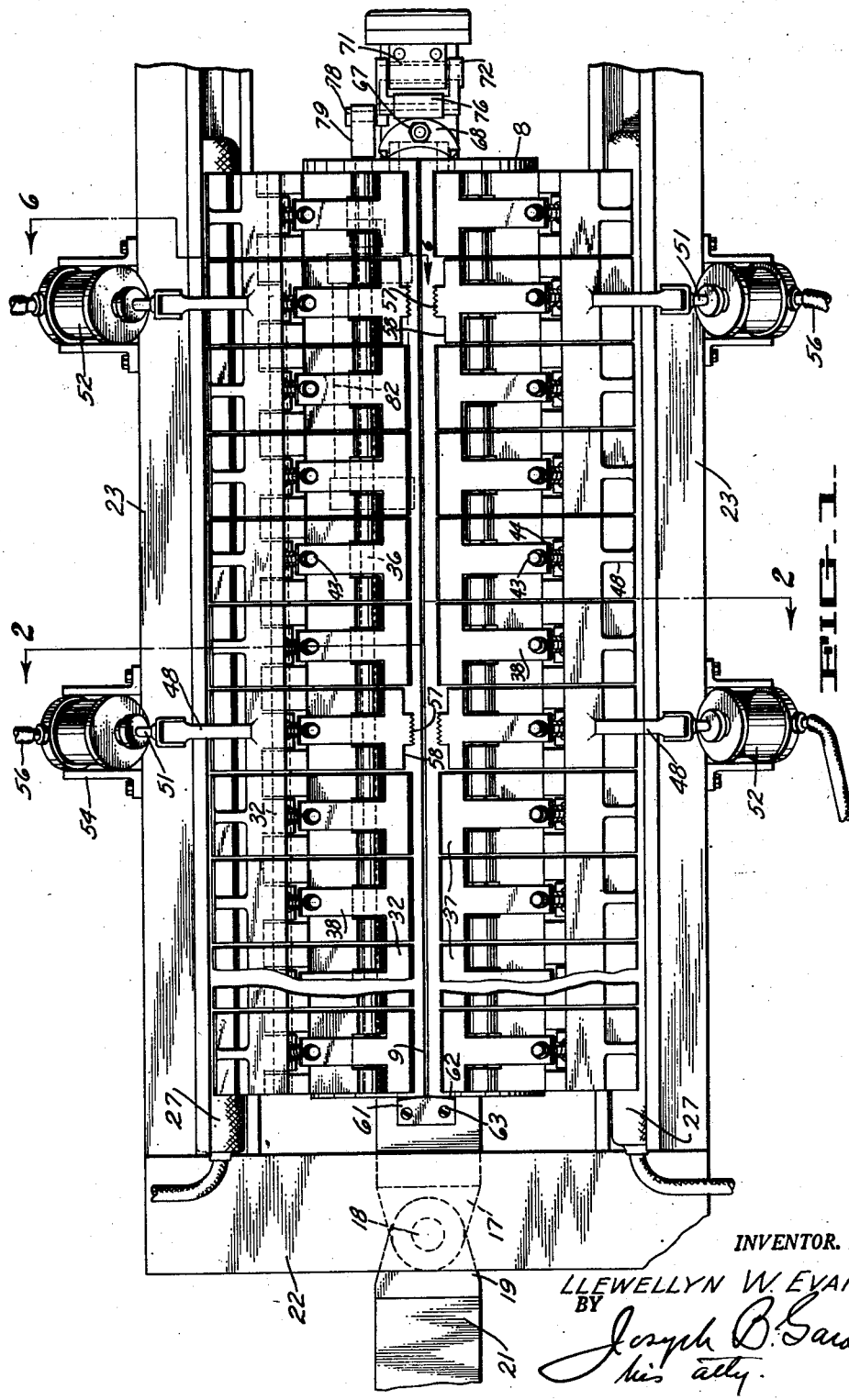
Figure 1 is a top plan view of a work-holding fixture embodying the improvements of my invention.
Figure 6:
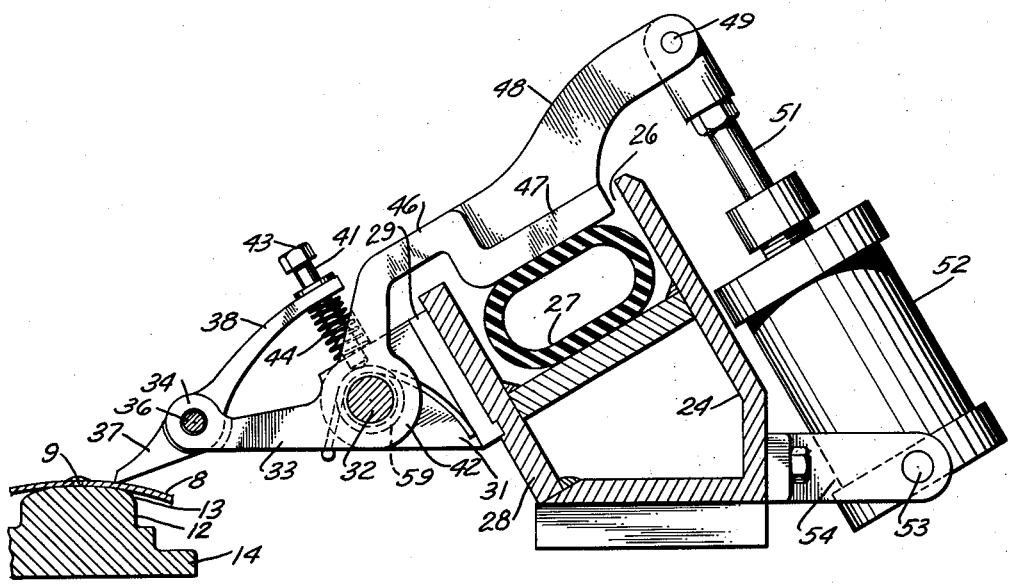
Figure 6 is an enlarged scale vertical sectional view taken in the plane indicated by the line 6—6 of Figure 1 and showing the hold-down jaws in engaged position.
Figure 7:
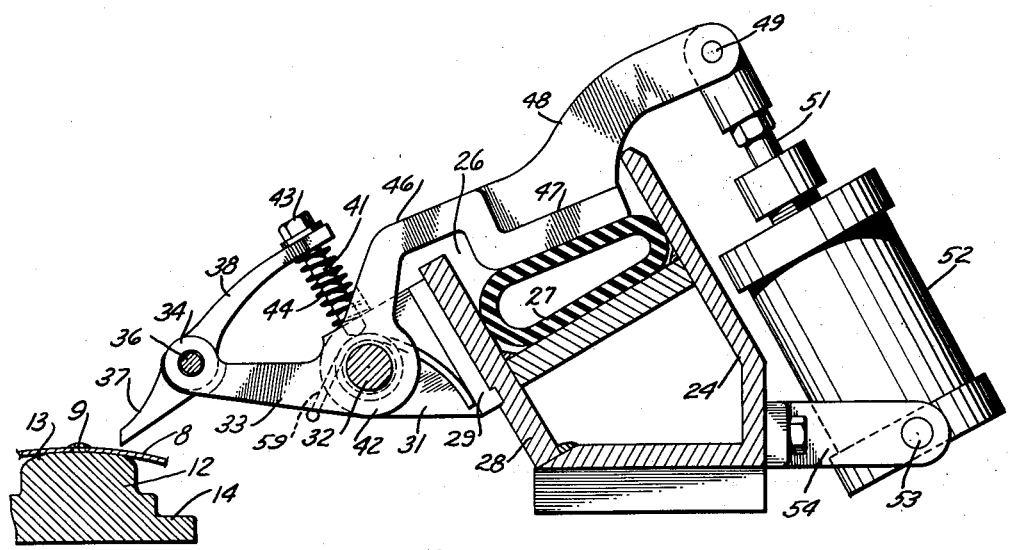
Figure 7 is a view, similar to Figure 6, showing the hold-down jaws in disengaged position.

In the production of tubular bodies formed from flat plates rolled to cylindrical shape and welded along the longitudinal butt, it is absolutely necessary in order to obtain a sound and uniform weld, to securely hold the abutting ends of the plate tightly together and in relative planar alignment. Non-observance of these conditions may cause "blow-through" of the molten metal under the electric arc as the result of excessive gap in the butt, possible entrapment of slag in the weld, and non-uniformity of weld penetration and density due to rapid fluctuations in the gap distance between the plates being welded and the arc end of the welding rod. Welds thus produced are quite liable to contain voids or weak spots which may cause leaks in the seam or eventual cracking of the shell. Furthermore, unless provision is made to counteract it, linear expansion of the marginal zones of the plate paralleling the butt, due to absorption and inadequate dissipation of heat from the welding arc, will cause progressive lateral opening of the butt gap with the result that the aforesaid "blow-through" is inevitable and the gap will soon become so enlarged that insufficient metal can be deposited from the welding rod to adequately fill it. It will be readily seen that a tubular body so welded will be appreciably frusto-conical, in longitudinal cross-sectional form, rather than cylindrical which will create further production difficulties where a pre-sized circular head member or other closure is to be subsequently fitted and secured in the diametrically enlarged end of the body.

I have provided an improved work-holding fixture which has been designed to overcome the aforesaid deficiencies of previously existing fixtures of this type and to produce welded-seam tubular bodies which, throughout their axial extent are possessed of uniform diametrical size.

In carrying out the present invention, I provide, for the pre-shaped tubular shell 8 which is to be welded along the axially-extending butt 9, a support preferably comprising a horizontally disposed arm 11 which may be a structural H-beam or the like having a maximum lateral cross-sectional dimension which is less than the internal diameter of the smallest shell to be accommodated by the machine so as to permit telescopic interengagement of the shell and the support arm. Also included in the transverse volumetric bulk of the support arm is a chill bar 12, composed of copper or other metal possessing a high degree of heat conductivity, which has an upper crowned surface 13 curved to conform with the internal wall curvature of the aforesaid minimum diameter shell to be accommodated and which is further provided with a flange 14 extending along its lower portion by means of which the chill bar may be bolted or otherwise secured to the upper flange 16 of the support arm 11. One end of the arm 11 carries a bracket 17 in which is journaled an axially vertical pivot pin 18 supported at its upper and lower ends in clevise arms 19 or the like carried by a standard 21 or other structure rising from the shop floor above which the shell support arm 11 is vertically spaced. The end of the shell support arm, opposite that carrying the pivot pin 18, is free and unobstructed by parts having a considerable degree of lateral extension so that the shell may be placed on and removed from the support arm from the free end thereof. The purpose of providing the pivot mounting for the support arm is so the latter may be swung as desired into alignment with separate paths of conveyance along which the welded shells may be carried for delivery to advance stations wherein additional fabricating operations are to be carried on.

Previously, preparatory to continuously welding the butt 9 of the shell, the opposite end portions of the butt at the junctions of the latter with the end surfaces of the shell were provided, after the shell had been diametrically compressed to interengage the butt faces, with short tack welds designed to hold the end portions of the shell in properly sized shape until the ensuing extended butt weld was completed. Intermediate portions of the shell were clamped down in one of a variety of ways so as to maintain the confronting longitudinal edges of the shell plate in proper alignment with each other. These precautions of tack-welding and clamping were highly essential to the production of properly sized shells for the reason that the formation of and extended high temperature arc weld between plates not similarly secured will cause excessive localized absorption of heat by the shell metal adjacent to and along the butt thereby instituting and propagating such linear expansion of the shell plate that the butt gap will progressively open laterally. This will not only result in a butt gap which is excessively wide and incapable of being completely and properly filled with metal deposited by the electrode rod of the welding machine, but the finished shell will be found to have at one end, an enlarged diameter which is substantialy equal to one-third of the amount that the gap has expanded at said end, while at other points intermediate the ends of the shell diametrical enlargement will be in proportion to the coplanar gap expansion. Usually, shells so formed are subsequently fitted with disk or cap type end closures and due to the weld deformation of the former the proper fitting and welding of these closures is rendered exceedingly difficult and time-consuming.

I have, to a substantially complete extent, eliminated the above-mentioned operational difficulties together with the neecssity of applying temporary holding means in the form of the aforesaid tack-welds to the shell before the subsequent finish weld is formed. Secured to the bracket 17 and extending equidistantly in opposite directions horizontally therefrom, I provide a header 22 to the distal ends of which are secured support rails including base elements comprising structural beams 23 spaced from and paralleling the support arm 11. The beams 23 are co-extensive with the arm 11 and are free at their outer ends so as to provide unhindered movements of shells onto and from the support arm. Suitably secured to the top of each beam 23 and coextensive therewith is a support preferably comprising a bar member 24 having therein an upwardly opening channel 26 coextensive with the beam 23 supporting it and in which is disposed a radially-yieldable tube 27 of rubber, or other material having the characteristics of rubber, whose function will be described presently. Suitably secured to the inner relatively confronting faces 28 of the channeled bar members 24 and arranged in a horizontally aligned file therealong, are groups of preferably separate brackets 29 each of which is provided with relatively spaced ears 31 extending inwardly toward the chill bar 12, and fitted with an axially horizontal pivot pin 32 secured in any suitable manner in the ears. Between each pair of ears 31, and journaled on the pivot pin 32 thereof, I provide a lever 33, extending toward the chill bar 12, and provided at its distal end with horizontally spaced apertured ears 34 carrying a pivot pin 36 on which is rockably mounted a downwardly extending chisel-shaped finger 37. Formed integrally with the finger 37 and extending upwardly oppositely thereto from the pin 36 is an arm 38 having at its extreme end an enlarged aperture 39 in which is slidably disposed a stud 41 having one end thereof threadedly engaged in the hub 42 of the lever 33 and provided at the other end with a head or nut 43 overlying the upper surface of the arm so as to limit upward movement of the latter. An axially compressed spring 44 concentric with the stud and interposed between the confronting surfaces of the arm 38 and hub 42 tends to forcibly but yieldably retain the arm at its upper extremity of movement and to impose a corresponding downward pressure on the finger 37. Extending upwardly from each hub 42 is an actuating arm 46 provided with an integral pad 47, overlying the adjacent channel 26, which bears on the pressure tube 27 in the channel. Opposed pairs of the pads 47 located, respectively adjacent the center and toward one end of the rows of fingers 37 are provided with integral levers 48 extending beyond the outer sides of the channels and connected, by means of pivot pins 49 with the plungers 51 of pneumatic cylinders 52 which are provided at their lower ends with pivot pins 53 engaged in brackets 54 which mount the cylinders for rocking movement on the bar members 24. Both the cylinders 52 and the pressure tubes 27 are supplied with air under pressure from a common source by flexible conduits 56, the reversals of flow of air in which may be controlled by a suitable control valve in a manner well known to those skilled in the art.

All of the fingers 37 are composed of copper with the exception of those powered directly by the air cylinders 52, the latter fingers being constructed of steel. As will be seen in Figure 1, the copper fingers, at the distal end thereof, are each provided with a continuous horizontal edge while the steel fingers are provided in their corresponding edge with central portions having sharp teeth 57 formed therein, the remaining portions 58 of the fingers lying on either side of the central portion being set back slightly from the points of the teeth. Preferably the toothed portion of each steel finger is case hardened so as to reduce as much as possible abrasive wear in the teeth.

As will be seen in Figure 2, the cylindrically shaped plate forming the shell 8 is telescoped over the arm 11 and chill bar 12 with the longitudinal edge portions of the shell resting on and substantially centered laterally of the crowned surface 13 of the chill bar. If compressed air is now admitted to the cylinders 52 and to the pressure tubes 27 the latter upon expanding and the piston rods 51 upon moving upwardly will swing all of the levers 33 downwardly in unison thereby forcibly pressing the fingers 37 into firm engagement with the shell 8 and urging the latter into engagement with the chill bar. It will be noted that the mechanism is so arranged that when the distal ends of the fingers first engage the shell, the pivot pin 36 of each finger will lie considerably above a plane intersecting the axis of the lever pivot pin 32 and the point of engagement of the finger with the shell. It will also be seen that as the lever 33 moves downwardly, the resulting knuckle action of the finger relative to the lever will cause the distal extremity of the finger to move horizontally across the sleeve toward the vertical center plane of the chill bar thereby urging the confronting edges of the plate toward each other so as to tightly close the butt gap 9. The downward pressure component exerted by the fingers will also firmly press the shell against the copper chill bar 12 thereby electrically grounding the shell, which forms one of the circuit electrodes during the welding process, and insuring complete penetration of the weld. A large portion of this butt closing pressure will be supplied by the frictional and tractional engagement between the copper fingers and the shell but also a considerable amount of force will be derived from the positive engagement between the steel fingers and shell due to indentation of the latter by the teeth 57 of the steel fingers. When the fingers 37 are all in their ultimate positions of engagement with the shell 8 it will be seen that the rows of fingers provide there between a V-shaped trough overlying the butt to be welded and extending throughout the length of the latter in which is received the granular flux material necessary to blanket the electrode rod of the automatic welding machine against undesirable oxidation of the molten metal as fusion in the weld takes place. The flux material also reduces spattering of weld metal due to arc "blow" and vapor pressure of the melting material, and any spatter that may escape through the flux blanket will not seriously foul the apparatus due to the fact that it cannot adhere tenaciously to the immediately adjacent copper fingers forming the side members of the trough. Upon completion of the weld, the cylinders 52 and pressure tubes 27 are manually vented to exhaust the compressed air therefrom whereupon coiled springs 59, associated with each lever 33 and which had been increasingly stressed during the lever movement to press the fingers 37 against the shell 8, recoil to simultaneously raise all of the levers 33 and consequently the fingers from engagement with the shell thereby permitting the latter to be withdrawn from the arm 11 and chill bar 12 and to be replaced with the next succeeding shell to be welded.

In continuously welding a butt seam, particularly if the latter is of considerable length such as that shown in the drawing, distortion in the form of progressive lateral widening of the butt gap due to longitudinal expansion of the portions of the plates immediately bordering the gap by reason of inability of the plates to radiate heat from the welding arc as rapidly as said heat is absorbed by the plates. The usual practice in combatting this distortion is to tie the plate members together, preferably by means of short so-called tack welds located at and bridging the opposite ends of the butt, after which the continuous weld along the butt is made. In production line manufacturing procedure, wherein ultimate output is the goal, the extra operations of pre-sizing the shells and applying the tack welds thereto are seriously time-consuming and add materially to the production costs. The apparatus to be described in addition to that disclosed above not only fully eliminates the necessity for making the aforesaid tack welds but contributes to the production of shells which are of identical size and of equal diameter throughout their lengths. As shown in Figure 1, I provide the chill bar 12 near the pivotally secured end of the arm 11 with a stop block 61 or an equivalent element provided with a ganging face 62 rising perpendicularly from the chill bar crowned surface 13, the latter being located slightly beyond the end of the rows of fingers 37. Suitable means, such as the screws 63 shown, may be employed to secure the block 61 to the chill bar or to any other convenient portion of the arm 11 adjacent the chill bar. Referring now to Figures 3 to 5 inclusive it will be seen that I provide the outer or free end of the arm 11, in a portion thereof spaced vertically below and slightly outwardly from the end of the chill bar with an axially horizontal pivot shaft 64 disposed transversely of the arm and carrying an upwardly extending rocker arm 66 to the upper end of which is secured, by a screw 67 or by other suitable means, a clamp jaw 68 having hardened, knife-edged, relatively spaced teeth 69 which are disposed in confronting relation with the adjacent end of the shell 8 and which extend transversely thereacross. Also carried by the upper portion of the outer free end of the arm 11 is a bearing block 71 having journaled therein an axially horizontal shaft 72 to the opposite ends of which are secured relatively parallel arms 73 in the outer ends of which is carried a shaft 74 journaling a roller 76 disposed between the arms and confronting the rocker arm 66. One of the arms 73 has a lever 77 formed integrally with and extending downwardly therefrom to the lower end of which is secured by a pivot pin 78, the clevised end 79 of a piston rod 81 slidable in a double-acting air cylinder 82 whose end cap 83 is fitted with a bearing ear 84 journaled for rocking movement on a fixed pivot pin 86 secured to and extending from a side of the arm 11. In released position, as illustrated in Figure 4, the piston rod 81 is fully extended which rocks the shaft 72 so as to incline the arms 73 downwardly and lower the roller 76 thus letting the rocker arm 66 tilt away from the end of the shell 8. When a preformed shell is slid longitudinally onto the arm 11 and chill bar 12, the shell is moved lengthwise until it engages the stop 61 after which the air is turned into the pressure tubes 27 and the cylinders 52 so as to actuate the fingers 37 to grip the shell and close the butt gap as was explained previously. After this latter action occurs, air is admitted into the cylinder 82 to retract the piston rod 81, as shown in Figure 3, which raises the roller 76 engaging the rocker arm 66 so as to move the teeth 69 into engagement with the end of the shell on opposite sides of the butt gap. The curvature of the surface 87 with which the roller 76 is engaged is such that, during the first portion of upward movement of the roller, the movement of the rocker arm 66 toward the end of the shell 8 will be comparatively rapid whereas when the roller approaches its upper limit of travel the resulting movement of the rocker arm will be comparatively slight. Thus a maximum leverage ratio is gradually reached between the moving roller and rocker arm which imparts sufficient pressure to the teeth 69 to cause the latter to forcibly and considerably indent the end of the shell as shown in Figure 5. Thus, since the clamp jaw 68 straddles the butt gap, the embedded teeth 69 will securely tie together against relative separation the opposed marginal portions of the shell sheet bordering the gap. This locking of the shell, together with the clamping action of the copper fingers 37 and the toothed steel gripping fingers 57, will tightly hold the shell on the chill bar against distortion caused by thermal expansion of the metal until the continuous weld 9 can be made along the entire length of the butt gap. The direction in which the weld is made is from the left end to the right end of the shell as the latter is shown in Figure 1; the holding means comprising the toothed fingers 57 and the butt straddling teeth 69 being grouped closer to the terminal end of the weld than to the starting point thereof. The reason for such distribution of these elements is that, in the primary stages of the weld, the heat absorbed by the shell plate will travel into the cool plate areas ahead of and laterally of the weld and consequently little or no lateral spreading of the butt gap will occur. However, as the absorbed heat crowded ahead of the advancing arc becomes too great to be rapidly dispersed in the plate or radiated therefrom, the maximum distortion will occur. Consequently the placement of the toothed gripping elements at points toward the termination end of the weld will forcibly counteract distortion caused by expansion and will result in the production of shells which are of uniform size and shape. After the butt weld has been completed, the air is released from the pressure tubes 21 and the cylinders 52 and 82 which will allow the fingers 37 and 57 to release and the teeth 69 to relinquish their grip on the shell thereby permitting the latter to be withdrawn from the supporting arm and chill bar and to be replaced with another preformed but unwelded shell whereupon the operational cycle of events explained above may be repeated.

I claim:

1. A fixture for holding a hollow cylindrical element or the like having a longitudinal open seam along which a continuous extended weld is to be made, comprising a longitudinally extending support on which said element may be positioned, support beams extending longitudinally and paralleling said support and said seam on each side of the latter, said support beams having channels therein disposed above the level of said support and extending substantially throughout the length thereof, levers disposed above the level of and extending toward said support mounted for pivotal movement on said beams, extensions on said levers extending away from said support and overlying said channels, fingers mounted for pivotal movement at the ends of said levers extending downwardly and toward incremental areas of said element bordering said seam, means interposed between said fingers and levers for yieldably restraining movement of said fingers relative to said levers, expandible means in said support beam channels engaged with said lever extensions for simultaneously initially moving all of said levers and fingers downwardly toward said element to press said element against said support and upon further actuation thereof for simultaneously moving said fingers transversely of said support to urge adjacent areas of said element bordering said seam to move relative to each other.

2. A fixture for holding a hollow cylindrical element or the like having a longitudinal open seam along which a continuous extended weld is to be made, comprising a longitudinally extending support on which said element may be positioned, support beams extending longitudinally and paralleling said support and said seam on each side of the latter, said support beams having channels therein and extending substantially throughout the length thereof, levers disposed above the level of and extending toward said support mounted for pivotal movement on said beams, extensions on said levers extending away from said support and overlying said channels, fingers mounted for pivotal movement at the ends of said levers extending downwardly and toward incremental areas of said element bordering said seam, means interposed between said fingers and levers for yieldably restraining movement of said fingers relative to said levers, expandible means in said support beam channels engaged with said lever extensions for simultaneously moving all of said levers and fingers toward said element, fluid operated cylinders pivotally mounted on said beams and having extendible piston rods connected with the lever extensions of some of the fingers for forcibly pressing the latter against the element, said fingers upon initial downward movement of said lever exerting pressure vertically of said support to press the element against the support and said fingers upon further downward movement of the lever exerting pressure transversely of the support to urge adjacent areas of the element bordering said seam to move relative to each other.

LLEWELLYN W. EVANS.

REFERENCES CITED

The following references are of record in the file of this patent:

UNITED STATES PATENTS

| Number | Name | Date |
|---|---|---|
| 524,330 | Lane | Aug. 14, 1894 |
| 1,812,959 | Judd | July 7, 1931 |
| 1,922,249 | Koch | Aug. 15, 1933 |
| 1,969,572 | Maurer | Aug. 7, 1934 |
| 1,987,664 | Brown | Jan. 15, 1935 |
| 2,219,742 | Haversack | Oct. 29, 1940 |
| 2,235,553 | Haversack | Mar. 18, 1941 |
| 2,256,879 | Cornell | Sept. 23, 1941 |
| 2,371,376 | Bisbee | Mar. 13, 1945 |
| 2,522,659 | Anderson | Sept. 19, 1950 |